United States Patent
Gao et al.

(10) Patent No.: US 11,113,426 B2
(45) Date of Patent: *Sep. 7, 2021

(54) METHOD OF INTERACTING WITH AN ELECTRONIC DEVICE WHILE THE DISPLAY SCREEN IS DEACTIVATED

(71) Applicant: BlackBerry Limited, Waterloo (CA)

(72) Inventors: Dapeng Gao, Burnaby (CA); Brian Alexander Oliver, Mercer Island, WA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,703

(22) Filed: Dec. 24, 2018

(65) Prior Publication Data

US 2019/0213360 A1   Jul. 11, 2019

Related U.S. Application Data

(63) Continuation of application No. 15/148,555, filed on May 6, 2016, now Pat. No. 10,169,620, which is a
(Continued)

(51) Int. Cl.
| | |
|---|---|
| H04M 3/00 | (2006.01) |
| G06F 21/83 | (2013.01) |
| G06F 3/038 | (2013.01) |
| H04M 1/673 | (2006.01) |
| G06F 21/62 | (2013.01) |
| G06F 21/84 | (2013.01) |

(Continued)

(52) U.S. Cl.
CPC .............. *G06F 21/83* (2013.01); *G06F 3/038* (2013.01); *G06F 21/6218* (2013.01); *G06F 21/84* (2013.01); *H04M 1/673* (2013.01); *G06F 3/0488* (2013.01); *G06F 3/04842* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 6,088,516 A * | 7/2000 | Kreisel | G06F 8/63 709/221 |
| 7,161,496 B2 | 1/2007 | Bocking et al. | |

(Continued)

FOREIGN PATENT DOCUMENTS

WO          03075585          9/2003

OTHER PUBLICATIONS

Office Action; CA application No. 2716234 dated Mar. 5, 2013.
(Continued)

*Primary Examiner* — Khalid W Shaheed
(74) *Attorney, Agent, or Firm* — Fish & Richardson P.C.

(57) ABSTRACT

A method of interacting with an electronic device while the display screen is deactivated and the electronic device is possibly locked is described. In one embodiment, the electronic devices generate a notification regarding a new event and/or device state using a notification element in response to receiving a predetermined key input from the hardware keyboard while the electronic device is in the locked state and while the display screen is deactivated, wherein the notification is generated while the display screen remains deactivated.

20 Claims, 4 Drawing Sheets

Related U.S. Application Data continuation of application No. 12/572,632, filed on Oct. 2, 2009, now Pat. No. 9,338,274.

(51) Int. Cl.
*G06F 3/0484* (2013.01)
*G06F 3/0488* (2013.01)

(56) References Cited

U.S. PATENT DOCUMENTS

| | | | |
|---|---|---|---|
| 7,231,231 B2 | 6/2007 | Kokko et al. | |
| 2002/0147524 A1* | 10/2002 | Nickum | G08B 1/08 700/204 |
| 2004/0239615 A1* | 12/2004 | Firebaugh | G06F 3/0395 345/156 |
| 2005/0079896 A1 | 4/2005 | Kokko et al. | |
| 2006/0154698 A1 | 7/2006 | Ogura | |
| 2007/0150826 A1 | 6/2007 | Anzures et al. | |
| 2007/0150842 A1* | 6/2007 | Chaudhri | G06F 3/04883 715/863 |
| 2007/0156821 A1* | 7/2007 | Hardy | G06Q 10/107 709/206 |
| 2007/0234208 A1 | 10/2007 | Scott | |
| 2008/0220752 A1 | 9/2008 | Forstall et al. | |
| 2008/0231610 A1 | 9/2008 | Hotelling et al. | |
| 2008/0316183 A1 | 12/2008 | Westerman et al. | |
| 2009/0006991 A1 | 1/2009 | Lindberg et al. | |
| 2009/0011763 A1 | 1/2009 | Torres | |
| 2009/0061823 A1 | 3/2009 | Chu | |
| 2009/0106679 A1 | 4/2009 | Anzures et al. | |
| 2010/0004031 A1 | 1/2010 | Kim | |
| 2010/0004035 A1 | 1/2010 | Ray | |
| 2010/0099394 A1 | 4/2010 | Hainzl | |
| 2010/0113072 A1* | 5/2010 | Gibson | G06Q 20/045 455/466 |
| 2010/0279712 A1 | 11/2010 | Dicke | |
| 2010/0313250 A1* | 12/2010 | Chow | H04L 63/08 726/5 |
| 2012/0011205 A1* | 1/2012 | Paulsami | G06Q 10/1095 709/206 |

OTHER PUBLICATIONS

Office Action; CA application No. 2716234 dated Feb. 21, 2014.
Communication pursuant to article 94(3); EP 09172149.8 dated Dec. 7, 2010.
Summons to attend oral proceedings; EP 09172149.8 Nov. 9, 2011.
Decision to Refuse; EP 09172149.8 dated Mar. 6, 2012.
Provision of a copy of the minutes in accordance with rule 124(4); EP09172149.8 Mar. 6, 2012.
Using the device lock feature—smartphone& pocket PCT magazine, www.smartphonemag.com/cms/node/2893 Mar. 27, 2008.
Discussion: Lock touch screen—HTC "http://wwww.htcwiki.com/thread/1078786/lock+touch+screen" Dec. 20, 2007.
EESR; EP09172149.8 Feb. 25, 2010.
Office Action; U.S. Appl. No. 12/572,632, dated Sep. 1, 2011.
Final rejection; U.S. Appl. No. 12/572,632, dated Feb. 10, 2012.
Advisory Action; U.S. Appl. No. 12/572,632, dated Jun. 5, 2012.
Communication regarding oral proceedings; EP09172149.8 May 15, 2017.
User manual of the "HTC Dream" smartphone; pp. 1, 2, 19-22, 172 and 173; http://d14.ht.com/web_materials/manual/htc_dream/ Apr. 28, 2017.
Office Action; U.S. Appl. No. 15/148,555, dated Nov. 30, 2017.
Final Rejection; U.S. Appl. No. 15/148,555, dated Mar. 28, 2018.
Advisory Action; U.S. Appl. No. 15/148,555, dated Jul. 20, 2018.

* cited by examiner

METHOD OF INTERACTING WITH AN ELECTRONIC DEVICE WHILE THE DISPLAY SCREEN IS DEACTIVATED

RELATED APPLICATION DATA

The present application is a continuation of U.S. patent application Ser. No. 15/148,555, filed May 6, 2016 (U.S. Pat. No. 10,169,620 B2, issued Jan. 1, 2019), which is a continuation of U.S. patent application Ser. No. 12/572,632, filed Oct. 2, 2009 (U.S. Pat. No. 9,338,274 B2, issued May 10, 2016), the content of both of these documents being incorporated herein by reference.

TECHNICAL FIELD

The present disclosure relates to computing devices, and in particular to a method of interacting with electronic devices in a locked state and a handheld electronic device configured to permit interaction when in a locked state.

BACKGROUND

The mobile nature of handheld electronic devices necessitates the provision of security features such as device locking to prevent the unauthorized use of such devices if stolen or lost by the device user. However, locking mechanisms used for handheld electronic devices are often "ports" or copies of those applied in the context of desktop computers or other stationary computers with little or no modification. These types of locking mechanisms do not take into consideration the unique environment and context in which handheld electronic devices are used relative to desktop computers.

Password locking mechanisms on handheld electronic devices, for example, are typically copies of password locking mechanisms used by desktop computers in which the device will be locked if it has not received an input from the user for a predetermined amount of time. For example, if the handheld electronic device has not been used for 30 minutes, the device will be locked and its display will be turned off. To unlock the handheld electronic device, the user must perform a predetermined action such as entering a predetermined password. Within the locked state, little if any interaction with the handheld electronic device is permitted apart from prompting and detecting performance of the predetermined action, such as the entry of the predetermined password, when the user attempts to use the device in the locked state. This type of locking mechanism fails to exploit the differences between a handheld electronic device and a desktop computer.

Thus, there remains a need for handheld electronic devices and methods which take advantage of unique aspects of mobile devices to provide increased convenience for the user of the device and/or increased security.

DETAILED DESCRIPTION OF EXAMPLE EMBODIMENTS

Figure 1:
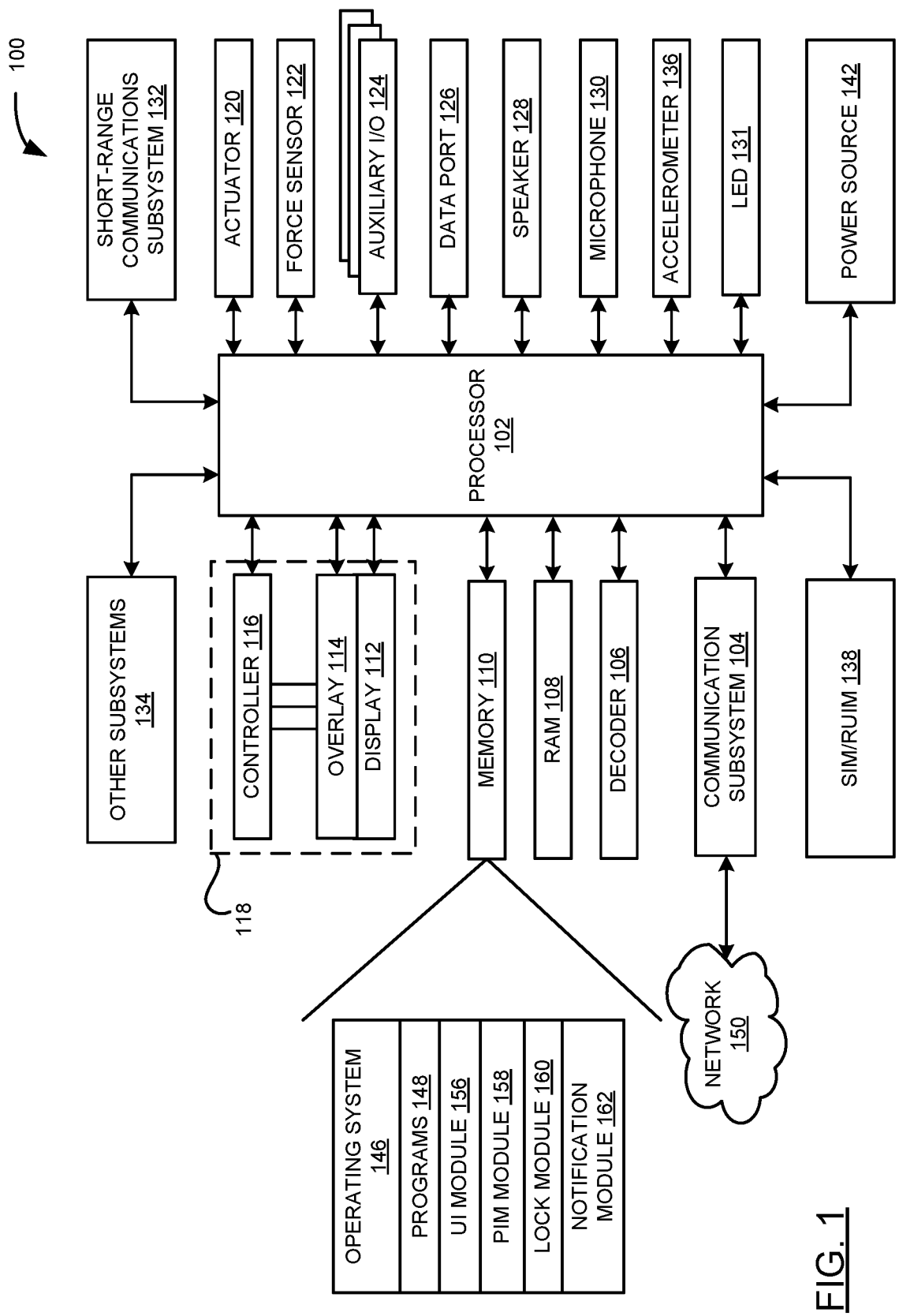
FIG. 1 is a block diagram illustrating a mobile communication device in accordance with one example embodiment of the present disclosure.

The present disclosure provides a method of user-initiated notifications on a handheld electronic device while in a locked state, the display screen is powered-off, or both. The notification may be new event information or other types of notification. Within the locked state, one or more predetermined user inputs are recognized as triggers to provide a notification (e.g., of any new events) via a notification element. In at least some embodiments, notifications are provided for different types of events. This allows a user to selectively generate notifications about each event type by providing the respective predetermined input required to generate the notification for the desired event type. The predetermined input may comprise any one or more of pressing a special function key in the control keys, pressing a predetermined key or key combination of keyboard or keypad of the device, a predetermined touchscreen gesture performed using the touchscreen, or a predetermined motion-based gesture performed by moving the device and which is detected by the accelerometer.

In some embodiments, more than one notification element is provided and each type of event is associated with a particular one of the notification elements. Different types of events may be associated with or "share" a notification element, or each notification element may be uniquely associated with a particular type of event. When a particular type of new event has occurred, the corresponding notification element is activated in response to detection of the predetermined input to provide the notification.

The notification element used for the notification may be an LED or speaker, thereby avoiding powering-on the display screen when the handheld electronic device is locked, the display screen is powered-off, or both. For handheld electronic devices, a significant amount of battery power is required to activate and sustain the display screen. In accordance with conventional locking mechanisms and power-saving features, device users must typically first unlock the device and/or power-on the display screen via corresponding input, and then obtain notifications concerning new events (such as new electronic messages or upcoming calendar events) by interacting with the corresponding application in the usual way. The present disclosure provides a mechanism which cooperates with locking mechanisms and/or power-saving features to allow device users to obtain notifications without unlocking the device or powering-on the display screen, thereby saving processing resources and battery power.

The teachings of the present disclosure relate generally to handheld electronic devices such as mobile communication devices including but not limited to pagers, cellular phones, Global Positioning System (GPS) navigation devices and other satellite navigation devices, smartphones, wireless organizers and wireless personal digital assistants (PDA). Alternatively, the handheld electronic devices could be a device without wireless communication capabilities such as a PDA, electronic gaming device, digital photograph album or picture frame, digital camera, or digital video recorder such as a camcorder. The handheld electronic device may comprise a touchscreen display as well as a keypad. It is also possible that the teachings of the present disclosure could be applied to electronic devices other than handheld electronic devices such as notebook computers. These examples are intended to be non-limiting.

In accordance with one embodiment of the present disclosure, there is provided a handheld electronic device, comprising: a controller; a display screen connected to the controller; an input device connected to the controller; a communication subsystem connected to the controller for communication over a wireless network; a notification element connected to the controller; wherein the controller is configured for: initiating a locked state on the device in response to detection of a trigger condition; monitoring for one or more predetermined inputs via the input device when the device is in the locked state; and generating a notification via the notification element in response to detection of a predetermined input when the device is in the locked state.

In accordance with another embodiment of the present disclosure, there is provided a method of interacting with an electronic device when in a locked state, the electronic device having an input device and a notification element, the method comprising: initiating a locked state on the device; monitoring for one or more predetermined inputs via the input device when the device is in the locked state; and generating a notification via the notification element in response to detection of a predetermined input when the device is in the locked state.

In accordance with a further embodiment of the present disclosure, there is provided a method of interacting with an electronic device, the electronic device having a display screen, an input device and a notification element, the method comprising: deactivating the display screen in response to detection of a trigger condition; monitoring for one or more predetermined inputs via the input device when the display screen is deactivated; and generating a notification via the notification element in response to detection of a predetermined input when the display screen is deactivated.

In accordance with yet a further embodiment of the present disclosure, there is provided a method of interacting with a handheld electronic device, the handheld electronic device comprising a processor, and a display screen, hardware keyboard, communication subsystem for communication over a wireless network, and notification element each coupled to the processor, the method comprising: initiating a locked state on the handheld electronic device; deactivating the display screen; and generating a notification regarding a new event and/or device state using the notification element in response to receiving a predetermined key input from the hardware keyboard while the handheld electronic device is in the locked state and while the display screen is deactivated, wherein the notification is generated while the display screen remains deactivated.

In accordance with yet a further embodiment of the present disclosure, there is provided a method of interacting with a handheld electronic device, the handheld electronic device comprising a processor, and a display screen, hardware keyboard, communication subsystem for communication over a wireless network, and notification element each coupled to the processor, the method comprising: deactivating the display screen; and generating a notification regarding a new event and/or device state using the notification element in response to receiving a predetermined key input from the hardware keyboard while the display screen is deactivated, wherein the notification is generated while the display screen remains deactivated.

In accordance with yet further embodiments of the present disclosure, there is provided a handheld electronic device, comprising: a processor; a display screen coupled to the processor; a hardware keyboard coupled to the processor; a communication subsystem coupled to the processor for communication over a wireless network; a notification element coupled to the processor; a memory coupled to the processor, the memory storing executable instructions that, when executed by the processor, cause the handheld electronic device to perform the methods set forth herein.

In accordance with yet further embodiments of the present disclosure, there is provided a non-transitory machine readable medium having tangibly stored thereon executable instructions for execution by a processor of a handheld electronic device, the handheld electronic device comprising a processor, and a display screen, hardware keyboard, communication subsystem for communication over a wireless network, and notification element each coupled to the processor, when executed by the processor of the electronic device, cause the a handheld electronic device to perform the methods set forth herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 116, memory 110, a display screen 112 (such as a liquid crystal display (LCD)) with a touch-sensitive overlay 114 operably connected to an electronic controller 108 that together comprise a touch-sensitive display 118, one or more actuators 120, one or more force sensors 122, one or more auxiliary input/output (I/O) subsystems 124, a data port 126, a speaker 128, a microphone 130, one or more LEDs 131, short-range communications subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
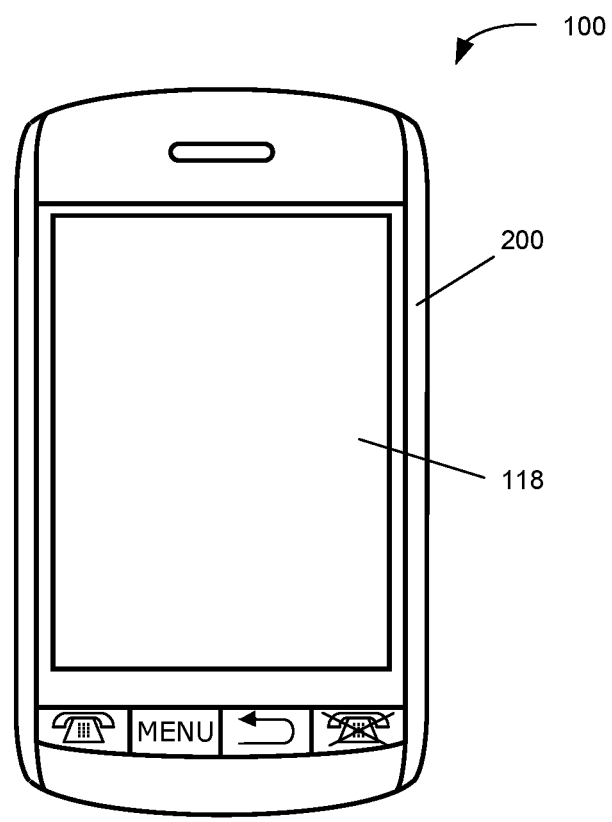
FIG. 2 is a front view of an example of a mobile communication device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The auxiliary I/O subsystems 124 could include other input devices such as one or more control keys, a keyboard or keypad, navigational tool (input device), or both. The navigational tool could be a clickable/depressible trackball or scroll wheel, or touchpad. The other input devices could be included in addition to, or instead of, the touch-sensitive display 118, depending on the embodiment.

The processor 102 operates under stored program control and executes software modules stored in memory 110. The software modules stored in memory 110 comprise an operating system 146, programs 148, a user interface module 156, a personal information management (PIM) module 128, a lock module 160, and a notification module 162. Any one or more of the modules 156 to 162 may be implemented through standalone software applications or programs 148, or combined together in one or more of the operating system 146 or other program 148. The functions performed by any of the above identified modules 156 to 162 may be realized as a plurality of independent elements, rather than a single integrated element, and any one or more of these elements may be implemented as parts of other program 148.

The user interface module 156 renders and displays the GUI of the device 100 in accordance with instructions of the operating system 146 and applications 148 (as applicable).

The PIM module 158 provides a PIM application which organizes and manages data items relating to the device user such as, but not limited to, email messages, calendar events, voicemail messages, instant messages, appointments, and task items. PIM data items and other information are stored in one or more memory stores, typically in the memory 110. The PIM application has the ability to send and receive data items via the wireless network 150. In some example embodiments, PIM data items are seamlessly combined, synchronized, and updated via the wireless network 150 with the user's corresponding data items stored and/or associated with a user's host computer system (not shown).

The lock module 160 implements lock and unlock processes for the device 100, examples of which are known in the art. In particular, the lock module 160 monitors for and detects predetermined trigger conditions for locking the device 100 when it is in an unlocked state, and monitors for and detects predetermined input for unlocking the device 100 when it is in a locked state.

The notification module 162 implements a context aware notification process which monitors for and detects predetermined inputs for interacting with the device 100 when it is in a locked state. The notification module 162 bypasses the lock module 160 when a predetermined input for interacting with the device 100 is detected. When an input other than a predetermined input for interacting with the device 100 is detected, such as the depression of a random key on a keyboard of the device 100, the input is passed to the lock module 160 which may utilise the input as part of its unlocking process. For example, the depression of the random key may be passed by the notification module 162 to the lock module 160 which may then activate the touch-sensitive display 118 (e.g., activate a backlight of the display screen 112) and display on the display screen 112 a prompt for entry of a predetermined password to unlock the device or other predetermined unlock input.

The one or more LEDs 131 comprise a number of different coloured LEDs such as red, green and blue LEDs. LEDs of a different colour may be used in addition to or instead of the red, green and blue LEDs in other embodiments, and more than one LED of each colour may be provided in some embodiments. In some embodiments, more or less than three LED colours may be used.

In some embodiments, the LEDs 131 may be implemented as a multi-colour LED module providing multiple notifications via a single notification element. Advantageously, the LEDs 131 may be exposed at the top of the device 100 to quickly convey information to the device user without the user being required to remove the device 100 from a carrying case, holster, cradle, docketing station or other enclosure (provided that the enclosure, e.g. carrying case or holster, has an open top or an opening to expose the LEDs). In some embodiments, a tricolour LED module may be used (e.g., red, green, blue), such as a tricolour LED module with four leads: one anode corresponding to each colour and a common cathode. Under control of the processor 102, the tricolour LED module may provide for a single notification element that may be controlled to be in multiple states including: off; red on; green on; blue on; and amber on (by combining green on and red on). In other embodiments, a light source other than an LED may be used.

The accelerometer 136, in some embodiments, is a digital 3-axis accelerometer comprising a sensing part connected to a controller via interrupt and serial interfaces. The operation of the accelerometer 136 is controlled by software which may be stored in internal memory of its controller, or possibly the processor 102 of the device 100. The controller of the accelerometer 136 may detect and recognize motion-based gestures in accordance with acceleration measured by the accelerometer 136, or raw acceleration data measured by the accelerometer 136 may be sent to the processor 102 of the device 100 via its serial interface where motion-based gesture recognition is performed by the operating system 146 or other software module. In other embodiments, a different digital accelerometer configuration or a suitable analog accelerometer and control circuit could be used.

Figure 3:
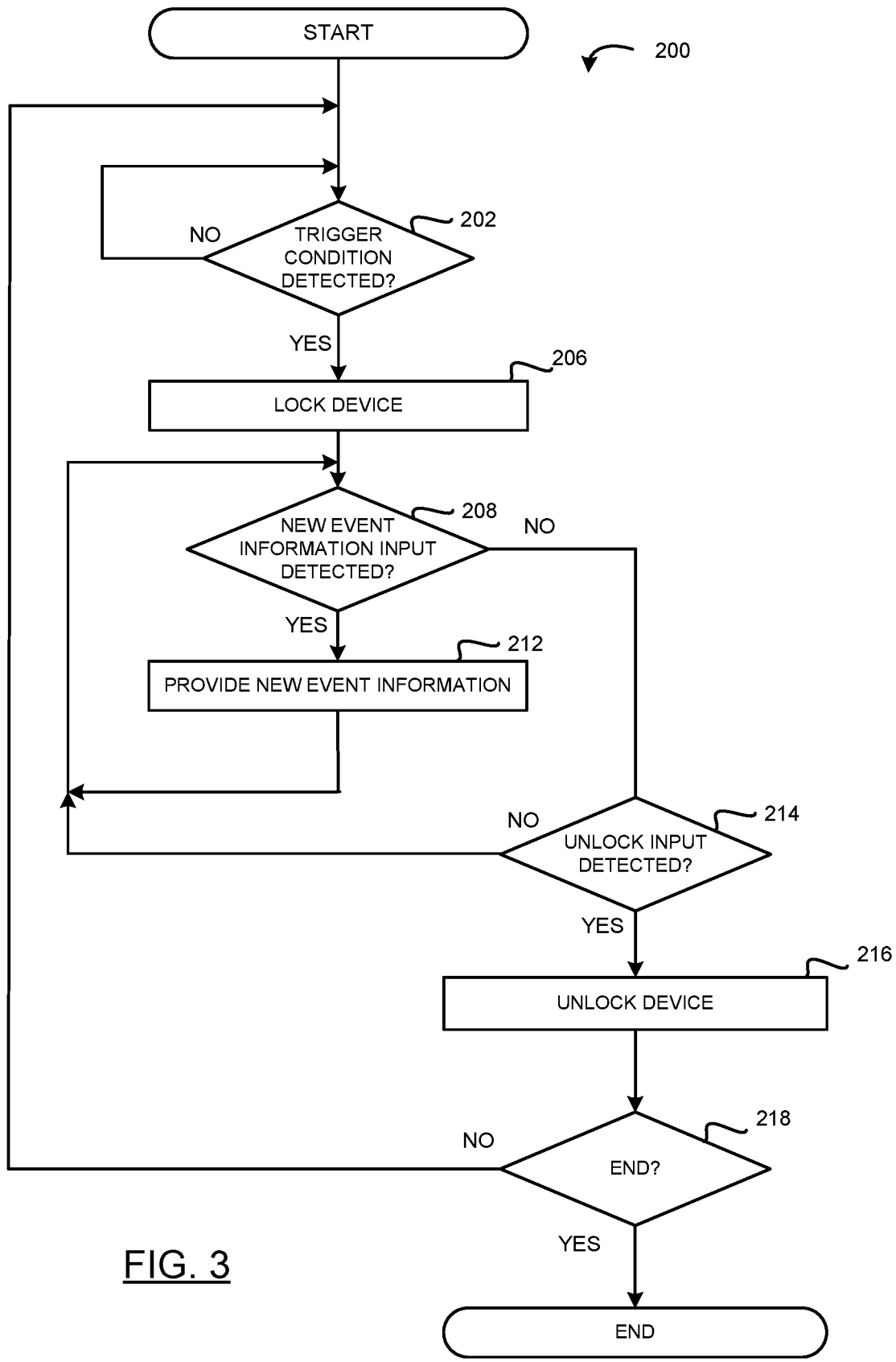
FIG. 3 is a flowchart illustrating an example process for a method of interacting with an electronic device in a locked state in accordance with one example embodiment of the present disclosure.

Reference will now be made to FIG. 3 which illustrates a flowchart of a process 200 for a method of interacting with an electronic device in a locked state in accordance with one embodiment of the present disclosure. The process 200 may be performed by a portable electronic device 100 (shown in FIG. 1), and more specifically, by the processor 102 (shown in FIG. 1) in accordance with the instructions of the lock module 160 and notification module 162.

First, at step 202 the processor 102 monitors for one or more predetermined trigger conditions for initiating a locked state on the device 100. The one or more trigger conditions may be any one or more of a selection of a device lock option via corresponding input via an input device, user inactivity for a predetermined duration, lack of wireless network coverage for a predetermined duration, a holstering or closing of the device 100 or other suitable trigger condition.

When a trigger condition is detected, the lock module 160 is configured to place the device 100 into a locked state in which restrictions limiting the interaction with the device 100 are enforced. The restrictions placed on the device 100 typically affect at least some of its input interfaces/devices (e.g., overlay 114, auxiliary I/O 124, accelerometer 136) and at least some of its output interfaces/devices (e.g., display screen 112, speaker 128 and LEDs 131). When no trigger condition is detected, the processor 102 continues to monitor for the one or more predetermined trigger conditions for initiating a locked state on the device 100 until the locking process is disabled.

While the restrictions placed on the device 100 in the locked state may vary, the restrictions typically prevent any files, messages or other information stored on the device 100 from being viewed, prevent any email or other electronic messages from being composed or sent, and prevent phone calls from being made from the device 100 (except, in some embodiments, selected phone calls such as 911 emergency calls which may be permitted when the device 100 is in the locked state). Incoming phone calls may be answered when in the device 100 is in the locked state in at least some embodiments. Locking of the device 100 effectively prevents the entry or extracting of information from the device 100 other than to enter a password or provide some other predetermined user input to unlock the device 100 recognized by the lock module 160 and enter or provide the predetermined inputs recognized by the notification module 162. In at least some embodiments, initiating the locked state comprises deactivating or turning off the display screen 112 and unlocking the device 100 comprises re-activating the display screen 112. Any combination or subcombination of the above-mentioned restrictions may be applied in the locked state of different embodiments.

Next, at step 208 when the device 100 is in a locked state the processor 102 monitors for one or more predetermined inputs for interacting with the device 100. The predetermined inputs could be any predetermined input specified by the notification module 162. In some embodiments, the one or more predetermined inputs comprise any one or more of pressing a special function key among one or more control keys, pressing a predetermined key or key combination of a keyboard or keypad of the device 100, performance of a predetermined touchscreen gesture performed by touching the touch-sensitive display 118 in a predetermined manner, or performance of a predetermined motion-based gesture performed by moving the device 100 in a predetermined manner (this motion being detected by the accelerometer 136).

In some embodiments, pressing a predetermined key or key combination of a keyboard or keypad once, or pressing a special function key once could be a first predetermined input for generating a first type of notification. Pressing the predetermined key or key combination of the keyboard or keypad twice, or pressing a special function key twice within a predetermined duration (e.g., 5 seconds) of each other could be a second predetermined input for generating a second type of notification.

A touchscreen gesture is a predetermined motion performed by touching the touch-sensitive display 118 in a predetermined manner, typically using a finger. Examples of a touchscreen gesture include a horizontal swipe and vertical swipe. A horizontal swipe gesture may include an initial contact with the touch-sensitive display 118 towards its left or right edge to initialize the gesture, followed by a horizontal movement of the point of contact from the location of the initial contact to the opposite edge while maintaining continuous contact with the touch-sensitive display 118, and a breaking of the contact at the opposite edge of the touch-sensitive display 118 to complete the horizontal swipe gesture. Similarly, a vertical swipe gesture may include an initial contact with the touch-sensitive display 118 towards its top or bottom edge to initialize the gesture, followed by a vertical movement of the point of contact from the location of the initial contact to the opposite edge while maintaining continuous contact with the touch-sensitive display 118, and a breaking of the contact at the opposite edge of the touch-sensitive display 118 to complete the vertical swipe gesture.

In some embodiments, the predetermined inputs comprise a horizontal swipe gesture (i.e., a left or right swipe) and vertical swipe gesture (i.e., an up or down swipe). In other embodiments, distinct predetermined inputs may be defined by each of a left swipe gesture (i.e., starting at the right edge of the touch-sensitive display 118 and moving leftwards), a right swipe (i.e., starting at the left edge of the touch-sensitive display 118 and moving rightwards), up swipe (i.e., starting at the bottom edge of the touch-sensitive display 118 and moving upwards), and down swipe (i.e., starting at the top edge of the touch-sensitive display 118 and moving downwards).

While interaction with the touch-sensitive display 118 is described in the context of fingers of a device user, this is for purposes of convenience only. It will be appreciated that a conductive stylus or other object could be used for interacting with the touch-sensitive display 118 depending on the type of touchscreen display 210.

A motion-based gesture is a predetermined motion performed by moving the device 100 in a predetermined manner such as a predetermined direction or series of directions. Motion-based gestures are identified by comparing the accelerations measured by the accelerometer 136 to reference data for the predetermined motions to determine whether the detected motion is characteristic of one of the predetermined motions. The predetermined inputs could be a forward movement, backward movement, up movement, down movement, left movement, right movement, tilt left movement, tilt right movement, swing left movement, swing right movement or any other predetermined movement such as a movement which approximate a letter, number of symbol, or a series of such movements. In some embodiments, a horizontal tilt or swing movement (i.e., a left or right horizontal tilt or swing movement) and vertical tilt or swing movement (i.e., an up or down tilt or swing movement). Alternatively, a left tilt or swing movement, right tilt or swing movement, up tilt or swing movement and down tilt or swing movement could each be distinct predetermined inputs.

Next, at step 212 when a predetermined input for interacting with the device 100 is detected while the device 100 is in the locked state, a corresponding notification is generated. Different types of notifications may be generated depending on the embodiment. Notifications may be provided for generated for new events, device states, or both. A different predetermined input triggers the corresponding notification for each type of notification. This allows a user to selectively generate notifications by providing the matching predetermined input. Accordingly, step 212 comprises determining a type of notification being requested based on the detected predetermined input (i.e., by determining the notification matching the predetermined input), querying operating system 146 or respective application 148 associated with the notification, receiving the notification information (e.g., new event information or device status information, and generating the determined type of notification in accordance with the notification information via a notification element.

The notification element is an output device which may be configured for generating a visual indication, audio indication, physical indication, or any combination thereof. The notification element may comprise the one or more of the LEDs 131 or other light source for generating a visual indication, an icon or other GUI notification element, the speaker 128 or tone generator (not shown) for generating an audio indication, or a vibrator (not shown) or buzzer (not shown) for generating a physical indication. More than one type of notification element may be provided and activated during the generation of the notification. The speaker 128 may be used to reproduce an automated voice message generated using text-to-speech synthesis based on notification information obtained by the notification module 162.

When more than one notification element is provided, each application, new event type or device state may be associated with a particular one of the notification elements. For example, one application could be associated with one LED 131 whereas other applications may be associated with other LEDs 131, respectively. Alternatively, a first application could be associated with one or the LEDs 131 (i.e., a visual indication), a second application could be associated with the tone generator or the speaker 128 (i.e., an audio indication), and a third application may be associated with the buzzer or vibrator (i.e., a physical indication). In other embodiments, different types of events could be associated with or "share" the same notification element. For example, each application, new event type or device state may be associated with a common LED 131.

The notifications may relate to new events regarding one or more applications on the device 100 such as an email application, calendar application, instant messaging application, etc. The notifications could relate to new events in respect of a PIM application provided by the PIM module 158. As will be appreciated by persons skilled in the art, a PIM application organizes and manages data items relating to the device user which may include email messages, calendar events, voicemail messages, instant message (IM) messages, appointments, and task items. Accordingly, the new events may be new electronic messages (e.g., new emails, SMS or MMS messages, IM messages, etc.), new voicemail messages, new images, new videos, new audio files, new tasks, or new or upcoming calendar events (for example, calendar events occurring within a predetermined duration of when the predetermined input is received).

New events could be unread electronic messages or other data items, unviewed or unplayed content, or new electronic messages or other data items or content received since a previous notification was provided irrespective of the status of data items as unread, unviewed or unplayed, as the case may be. When the notification relate to new events, the notification information may comprise new event information such as a number of new events (e.g., the number of new messages).

When a new event has occurred in respect of an application, the notification element corresponding to that application is activated in response to detection of the predetermined input to provide the notification in step 212. When the notification element comprises two or more LEDs 131, the step of generating the notification comprises flashing a respective one of the LEDs 131 corresponding to the respective application. The activation of the corresponding LED 131 may comprise flashing the LED 131 in a predetermined pattern for a predetermined period of time such as, for example, a five or ten second period.

In some embodiments, different coloured LEDs 131 may be flashed in a predetermined pattern sometimes referred to as a temporal colour pattern. Each temporal colour pattern provides a unique notification for a particular application or device state. Temporal colour patterns may comprise an interleaved repeating pattern of a first colour, a second colour, a third colour, and possibly a fourth colour when the device is in a state which is a combination of the first state, the second state, the third state, and the fourth state.

The flashing of the LEDs 131 may be in dependence on the new event information (e.g., number of new messages) or other notification information. For example, the number of times the LED 131 is flashed may depend on the number of new events or data items in respect of an application (e.g., number of new messages).

When the notification element comprises a number of different coloured LEDs 131, such as a red, green and blue LED 131, each colour may be associated with a particular application or device status in some embodiments to provide unique notifications.

One type of notification could be provided for an email application or PIM application to notify the user of new electronic messages (such as new email messages or SMS messages). Another type of notification could be provided to notify the user of a scheduled event in a calendar application or PIM application which is to occur within a predetermined duration from a time at which the predetermined input is received (i.e., the user request for notification).

In one example embodiment, the notification element comprises a tricolour LED 131 which, in response to a first predetermined input, is flashed red to indicate there are new email messages and is flashed green to indicate there are no new email messages. As noted above, the number flashes could depend on the number of new email messages. In response to second predetermined input, the LED 131 is flashed red to indicate there is one or more upcoming calendar events are scheduled to occur within a predetermined duration from the second predetermined input and is flashed green to indicate there is no upcoming calendar events are scheduled to occur within the predetermined duration from the second predetermined input. The number flashes could represent a time until the next upcoming calendar event. In response to a third predetermined input, the LED 131 is flashed red to indicate there are new text messages and is flashed green indicate there are no new text messages. As noted above, the number flashes could depend on the number of new text messages.

In another example embodiment, a horizontal touchscreen swipe gesture generates a notification regarding new electronic messages, whereas a vertical touchscreen swipe gesture generates a notification regarding new or upcoming calendar events occurring within a predetermined duration of a time at which the predetermined input is received. In other embodiments, the notifications triggered by the horizontal touchscreen swipe gesture and vertical touchscreen swipe gesture could be reversed.

In some embodiments, more than one predetermined input may generate the same notification. This may be advantageous in that at least some notifications, such as frequently requested notifications, have more than one trigger. This allows a predetermined input to be selected from multiple predetermined inputs associated with a notification to select the most appropriate input associated with the notification in the circumstances increasing the operability and functionality provided by the device 100. For example, when the device 100 is holstered it may be practical to use motion-based gestures rather than touchscreen gestures. In one example embodiment, a horizontal touchscreen swipe and a horizontal tilt or swing movement generate the same notification. Conversely, a vertical touchscreen swipe and a vertical tilt or swing movement generate the same notification. The matching of directional touchscreen gestures with directional motion-based gestures may be extended to other gestures including, but not limited to, left, right, up and down swipe gestures so that a touchscreen gesture and corresponding motion-based gesture generates the same notification.

While notifications have been described primarily in the context of new event information for new events, the notifications could be used to notify the user of a device state. Examples of device states which may be used in combination with the notifications described herein include a current state of charge of the power source 142 (e.g. battery), a state of connection to a long-range communication connection such as a cellular network, and a state of connection to a short-range communication connection (such as Bluetooth®) with a paired device. One or more of these device states may be associated with a predetermined notification in addition to, or instead of, the new events described above.

It will be appreciated that the above steps generate notifications or updates regarding various applications or device states without unlocking the device 100 and without activating the display screen 112 if it has been deactivated as part of the locking process or a power saving process. When the display screen 112 has been deactivated as part of the restrictions of the locked state, the display screen 112 remains turned off to preserve the power source 142 during the monitoring, detection and notification in steps 208 to 212.

Next, when an input other than one of the predetermined inputs for interacting with the device 100 is detected, it is determined whether this input is a predetermined "unlock" input to trigger the unlocking process. When an unlock input is detected, the process 200 proceeds to step 214 where the display screen 112 is reactivated and a prompt for entry of a predetermined password or PIN to unlock the device is displayed on the display screen 112. When the predetermined password or PIN is received via an input device within a predetermined duration, the process 200 proceeds to step 216 where the device 100 is unlocked and the restrictions of the locked state are removed. In other embodiments, all inputs other than the predetermined inputs for interacting with the device 100 cause the display screen 112 to be reactivated and a prompt for entry of a predetermined password or PIN to unlock the device to be displayed without determine whether such inputs are predetermined "unlock" inputs.

When predetermined password or other input to unlock the device is not received via an input device within a predetermined duration, the process returns to step 208 where the processor 240 monitors for predetermined inputs for interacting with the device 100.

Next, at step 218 if input to end the operations is received, the process 200 ends. If input to end the operations is not received, the process 200 then proceeds to step 202 where the processor 102 monitors for trigger conditions for initiating a locked state on the device 100.

While the process 200 has been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Although in the example embodiment described above the notification process works in combination with the locking and unlocking processes of the lock module 160, the teachings of the present disclosure could be applied in the absence of the locking and unlocking processes of the lock module 160. For example, in other embodiments the notification process may be applied whenever the display screen 112 is deactivated.

Figure 4:
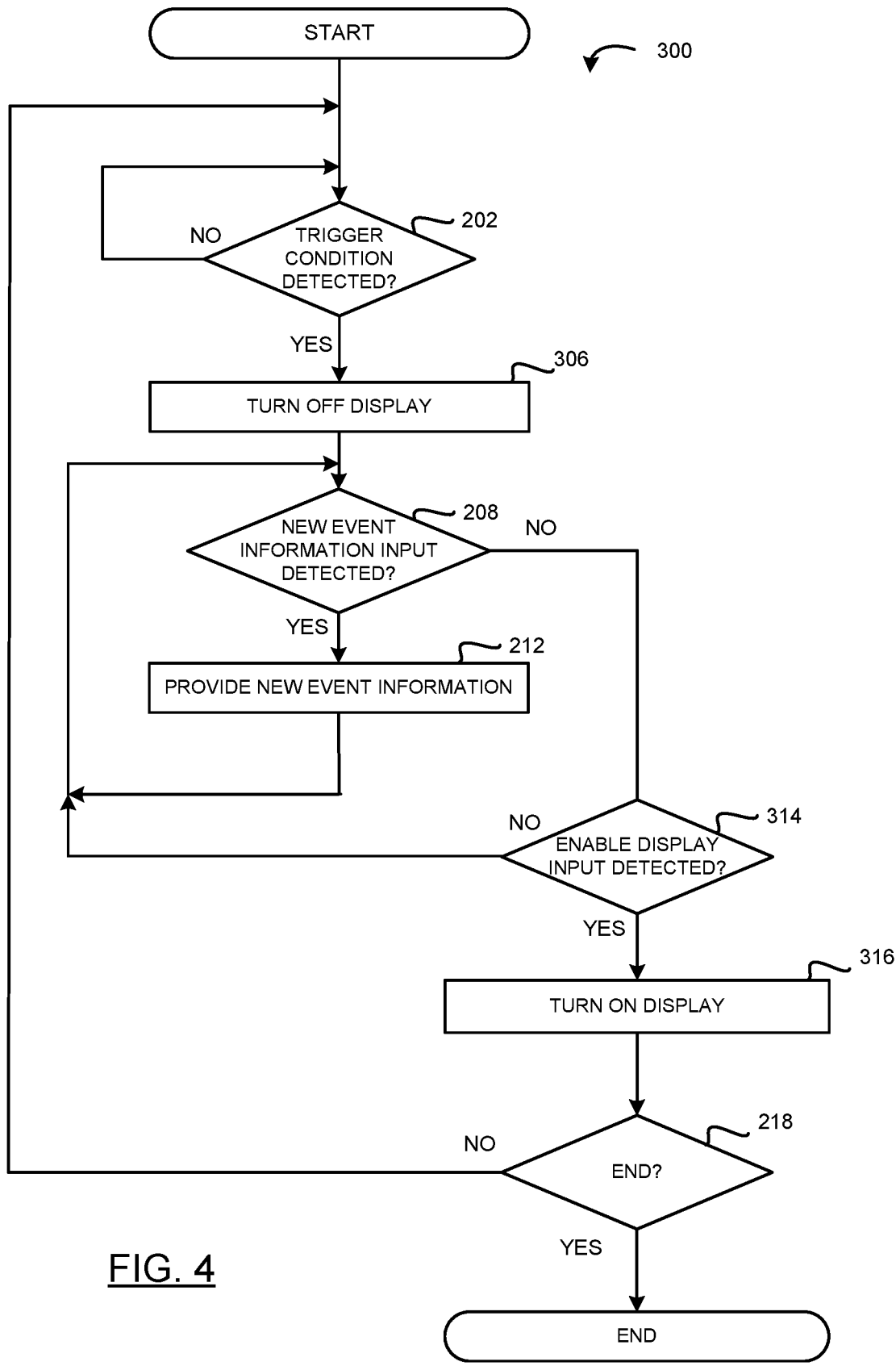
FIG. 4 is a flowchart illustrating an example process for a method of interacting with an electronic device when its display is disabled in accordance with one example embodiment of the present disclosure.

FIG. 4 illustrates a flowchart of a process 300 for a method of interacting with an electronic device when the display screen 112 is deactivated in accordance with one embodiment of the present disclosure. The process 300 may be performed by a portable electronic device 100 (FIG. 1), and more specifically, by the processor 102 (FIG. 1) in accordance with the instructions of a power saving module (not shown) stored in memory 110 and the notification module 162. The notifications are provided in the same manner in response to detection of the predetermined inputs for interacting with the device 100 described above in connection with the process 200. However, the trigger conditions in step 202 turn off the display screen 112 rather than lock the device (step 306). Conversely, predetermined inputs activated or enabling the display screen 112 are monitored for and detected (step 314). These inputs are different from the predetermined inputs for interacting with the device 100 and operate as "wakeup" inputs to a power saving process implemented by the power saving module. For example, the display screen 112 may be deactivated in step 306 in response to a trigger condition comprising a lack of user activity to save power. When a "wakeup" input is detected, the display screen 112 is re-activated (step 316).

Alternatively, in yet other embodiments, the notification process may be applied in connection with the locking and unlocking processes when the display screen 112 is not deactivated. In yet further embodiments, the notification process may be applied in the absence of both the locking and unlocking processes of the lock module 160 and power saving processes for deactivating the display screen 112 to save battery power.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A handheld electronic device, comprising:
a processor;
a display screen coupled to the processor;
an input device coupled to the processor;
an output device coupled to the processor; and
a communication subsystem coupled to the processor for communication over a wireless network;
wherein the processor is configured to:
turn off the display screen;
detect a first input at the input device; and
in response to the detection of the first input at the input device while the display screen remains turned off:
determine a number and type of new events associated with the first input; and
activate the output device a number of times equal to the number of new events of the event type associated with the first input.

2. The handheld electronic device of claim 1, wherein the first input comprises any one or more of pressing a special function key in the control keys, pressing a first key or key combination of keyboard or keypad of the handheld electronic device, a first touchscreen gesture performed using a touchscreen of the handheld electronic device, or a first motion-based gesture performed by moving the device and which is detected by an accelerometer of the handheld electronic device.

3. The handheld electronic device of claim 1, comprising a plurality of output devices comprising a light emitting diode (LED), a vibrator and a speaker, wherein the output device that is activated is selected from the LED, vibrator and speaker in dependence on the event type associated with the first input.

4. The handheld electronic device of claim 1, wherein the output device is a vibrator, wherein the processor is configured to cause the vibrator to vibrate a number of times in dependence on the number of new events of the event type associated with the first input.

5. The handheld electronic device of claim 1, wherein the output device is a speaker, wherein the processor is configured to cause the speaker to generate an audible notification specifying the number of new events of the event type associated with the first input.

6. The handheld electronic device of claim 1, wherein the processor is configured to:
monitor for the first input at the input device while the display screen is turned off.

7. The handheld electronic device of claim 1, wherein the processor is configured to:
monitor for one or more triggers for turning off the display screen, wherein the display screen is turned off in response to detection of one of the triggers.

8. The handheld electronic device of claim 7, wherein the triggers comprise one or more of user input, user inactivity for a first duration, or initiation of a lock state on the handheld electronic device.

9. The handheld electronic device of claim 1, wherein the processor is configured to:
monitor for new events at the handheld electronic device.

10. The handheld electronic device of claim 9, wherein a new event comprises any one of a receipt of a new data item, an upcoming calendar event or a change in device state.

11. The handheld electronic device of claim 10, wherein the new data item is a new electronic message.

12. The handheld electronic device of claim 11, wherein the new electronic message is one of a new email, new short message service (SMS) message, new Multimedia Messaging Service (MMS) message, new instant message (IM) or a new voicemail message.

13. The handheld electronic device of claim 10, wherein the new data item is a new image, new video, new audio file, or new task.

14. The handheld electronic device of claim 9, wherein a new event comprises a new or upcoming calendar event.

15. The handheld electronic device of claim 14, wherein an upcoming calendar event is a calendar event scheduled to occur within a first duration of a time at which the first input at the input device is received.

16. A method of interacting with a handheld electronic device, comprising:
turning off a display screen of the handheld electronic device;
detecting a first input at an input device of the handheld electronic device; and
in response to the detection of the first input at the input device while the display screen remains turned off:
determining a number and type of new events associated with the first input; and
activating an output device of the handheld electronic device a number of times equal to the number of new events of the event type associated with the first input.

17. A non-transitory machine readable medium having tangibly stored thereon executable instructions for execution by a processor of a handheld electronic device, wherein the executable instructions, in response to execution by the processor of the handheld electronic device, cause the handheld electronic device to:
turn off a display screen of the handheld electronic device;
detect a first input at an input device of the handheld electronic device; and
in response to the detection of the first input at the input device while the display screen remains turned off:
determine a number and type of new events associated with the first input; and
activate an output device of the handheld electronic device a number of times equal to the number of new events of the event type associated with the first input.

18. The handheld electronic device of claim 1, wherein the output device is a multi-color light emitting diode (LED), wherein the multi-color LED is activated in a particular one of a number of colors of the multi-color LED in dependence on the event type associated with the first input.

19. A handheld electronic device, comprising:
a processor;
a display screen coupled to the processor;
an input device coupled to the processor;
a multi-color light emitting diode (LED) coupled to the processor; and
a communication subsystem coupled to the processor for communication over a wireless network;
wherein the processor is configured to:
turn off the display screen;
detect a first input at the input device; and
activate the multi-color LED a number of times equal to a number of new events in response to detection of a first input at the input device while the display screen remains turned off, wherein the multi-color LED is activated in a particular one of a number of colors of the multi-color LED in dependence on an event type associated with the first input.

20. A handheld electronic device, comprising:
a processor;
a display screen coupled to the processor;
an input device coupled to the processor;
a plurality of notification elements coupled to the processor, wherein the plurality of notification elements comprise a light emitting diode (LED), a vibrator and a speaker; and
a communication subsystem coupled to the processor for communication over a wireless network;
wherein the processor is configured to:
turn off the display screen;
detect a first input at the input device; and
in response to the detection of the first input at the input device while the display screen remains turned off:
determine a number and type of new events associated with the first input; and
activate a notification element in the plurality of notification elements a number of times equal to the number of new events of the event type associated with the first input, wherein the notification element that is activated is selected from the LED, vibrator or speaker in dependence on the event type associated with the first input.

* * * * *